United States Patent [19]

Dimitriou

[11] Patent Number: 4,572,766
[45] Date of Patent: Feb. 25, 1986

[54] PLATE EVAPORATOR OR CONDENSER

[75] Inventor: Michael H. Dimitriou, Bretten, Fed. Rep. of Germany

[73] Assignee: W. Schmidt GmbH & Co. K.G., Bretten, Fed. Rep. of Germany

[21] Appl. No.: 500,350

[22] Filed: Jun. 2, 1983

[30] Foreign Application Priority Data

Jun. 2, 1982 [DE] Fed. Rep. of Germany ....... 3220774

[51] Int. Cl.⁴ .......................... B01D 1/22; F28F 3/08
[52] U.S. Cl. .................................. 159/28.6; 165/167
[58] Field of Search ............... 165/166, 167; 159/28 P

[56] References Cited

U.S. PATENT DOCUMENTS

| | | | |
|---|---|---|---|
| 3,155,565 | 11/1964 | Goodman | 165/167 |
| 3,211,219 | 10/1965 | Rosenblad | 165/166 |
| 3,590,917 | 7/1971 | Huber | 165/166 |
| 3,631,923 | 1/1972 | Izeki | 165/167 |
| 3,984,281 | 10/1976 | Buchwald | 159/28 |

Primary Examiner—David L. Lacey
Attorney, Agent, or Firm—Spencer & Frank

[57] ABSTRACT

A plate evaporator or condenser has a plurality of plates forming a plate stack and defining alternating chambers for a first fluid to be evaporated and a second fluid to be condensed. Each plate has embossed thereon a plurality of parallel spaced beads projecting into the chambers for the first fluid and are oriented parallel to the plate length. Mutually aligned beads of adjoining plates are in contact with one another. Each plate also has, embossed thereon, a plurality of spaced knubs situated between the beads and projecting into the chambers for the second fluid. Mutually aligned knubs of adjoining plates are in contact with one another. The plates further have first and second apertures provided in opposite end zones and extend substantially throughout the plate width. Mutually aligned respective first and second apertures of adjoining plates form first and second flow channels for the first fluid. The first and second flow channels are in communication with the chambers for the first fluid. Each plate has, in the end zones between the first and second apertures, first and second lateral enlargements projecting beyond the rectangular plate outline. Third and fourth apertures are provided, respectively, in the first and second lateral enlargements. Mutually aligned respective third and fourth apertures of adjoining plates form third and fourth flow channels for the second fluid. The third and fourth flow channels are in communication with the chambers for the second fluid.

10 Claims, 7 Drawing Figures

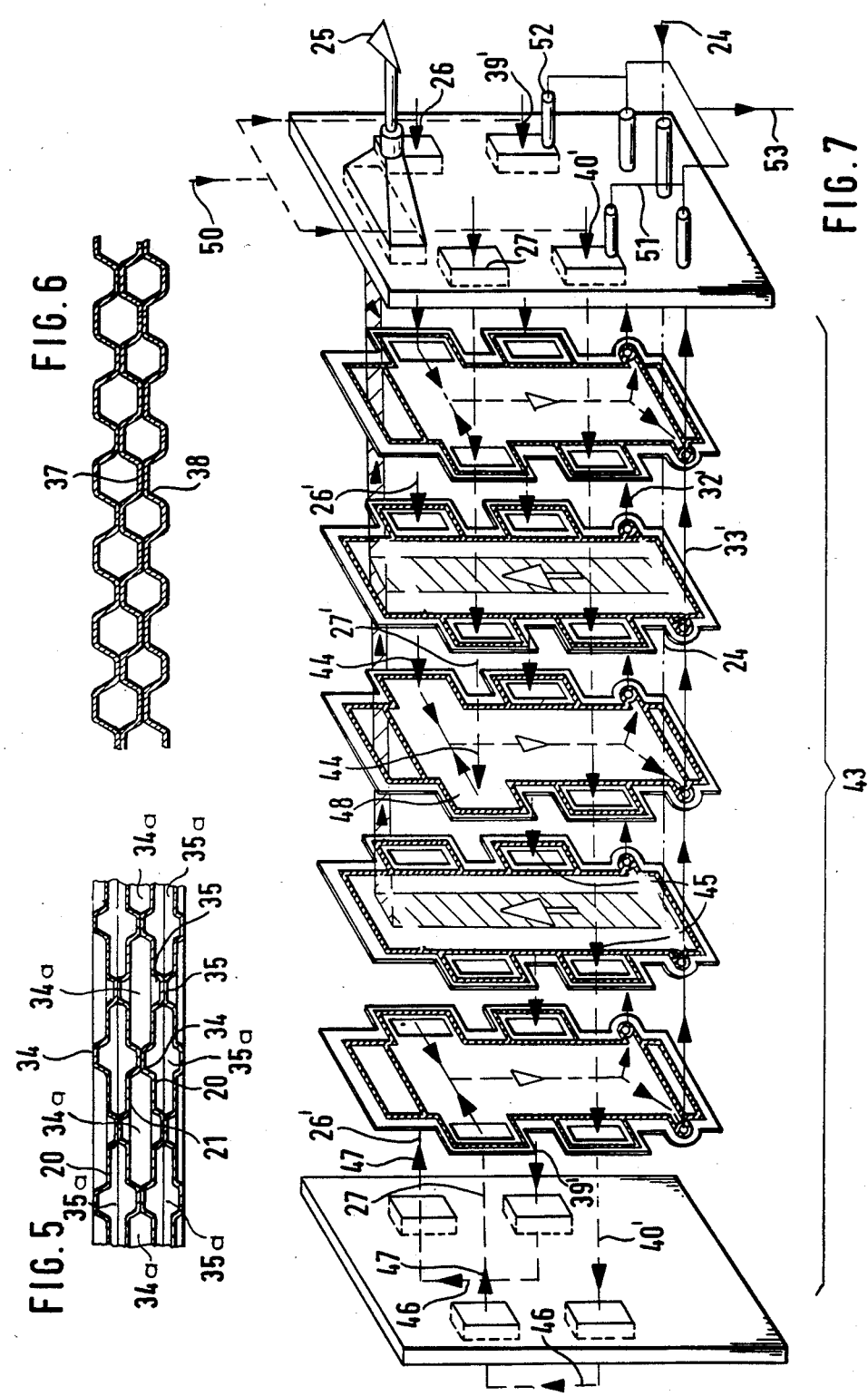

PLATE EVAPORATOR OR CONDENSER

BACKGROUND OF THE INVENTION

This invention relates to a plate evaporator or plate condenser which comprises a plurality of substantially rectangular plates stamped and profiled from sheet metal. The plates are guided in alignment with one another in a machine stand between an end plate affixed to the machine frame and a head plate movable with respect to the machine frame. The plates are, during operation, pressed to one another to form a plate stack. In this state, adjoining plates alternatingly define among themselves—with the aid of circumferential seals disposed in corresponding grooves of the plates—flow chambers for a fluid to be evaporated, on the one hand and for a fluid to be condensed, on the other hand. The two fluids are guided parallel to one another. The flow chambers are supplied with the fluid to be evaporated and with the fluid to be condensed, by means of aligned inflow and outflow openings formed by apertures in the plates, together with associated circumferential seals. The plates are, by means of their profiles, in mutually supporting contact with one another at locations on the plate faces.

In evaporators or condensers of the above-outlined type the fluid to be condensed is, as a rule, passed from above downwardly, while the fluid to be evaporated is, as a rule, guided in a counter current. The known plates have apertures for the inflow and the outflow for the fluid to be evaporated, on the one hand and for the fluid to be condensed, on the other hand. As a rule, these apertures are arranged in the corner zones of the rectangular plates or partly across their width in the upper or lower margin thereof. This means that the fluids first have to spread from the apertures over the chamber formed between the plates and then they have to be eventually again collected into a predetermined flow direction. This circumstance alone leads to an irregular or non-uniform stressing of the plate surfaces by the fluids and to the formation of non-uniform or partially interrupted liquid films.

Further, the plates are, over all the chambers, supported on one another by embossments such as cams or spherical protrusions and also partially by bead-like embossments guiding the fluid. This leads, particularly on the evaporator side, to permanent interruptions and disturbances in the liquid film under formation and thus results in undesirable turbulences.

In case the fluid to be evaporated contains solid particles, the above-outlined arrangements do not allow a dissipation of large, heat-caused stresses and further, the evaporation chambers are likely to be clogged by the solid particles. In this respect particularly the flat regions of the plates cause problems which, because of the flow conditions, are non-uniformly or alternatingly stressed by the fluid, so that in those locations overheating may occur which leads to a baking of the solids to the plate wall. Further, the continuous interference with the liquid film by the supporting cams and spherical embossments between the plates tend to prevent, on the one hand, a uniform heat exchange and, on the other hand, tend to create zones in which the above-noted phenomena of overheating may occur, together with the described consequences. For example, in an evaporator, high-viscosity concentrates may remain suspended at the cams or spherical embossments, as a result of which, during operation, the flow passage cross sections may change or be influenced additionally so that a relatively frequent opening and cleaning of the plates is necessary.

It is a further disadvantage of the known plate evaporators or condensers that the heat contained in the condensate cannot be utilized efficiently. In the known arrangements the heat is either dissipated without utilization or the condensate is used for prewarming the fluid to be evaporated, with the aid of an additionally required pump and an additionally required heat exchanger.

SUMMARY OF THE INVENTION

It is an object of the invention to provide an improved plate evaporator or condenser of the above-outlined type wherein the plates are of a construction which ensures an uninterrupted and undisturbed linear flow path in the plate chamber between inlet and outlet for the fluid to be evaporated and further, for the fluid to be evaporated there is ensured a flow path which is void of any appreciable cross-sectional changes so that the necessary points of support between the plates are located externally of the flow path of the fluid while, nevertheless, there is achieved a complete and uniform distribution of the fluid to be condensed over the plate surfaces associated with the fluid to be condensed. It is an additional object of the invention to provide the possibility in multistage evaporators or condensers to utilize, by virtue of an appropriate design of the plates, the condensate of one stage directly for the next stage for the purpose of vapor generation, with means which do not appreciably add to the costs of the evaporator or condenser.

These objects and others to become apparent as the specification progresses, are accomplished by the invention, according to which, briefly stated, the plate evaporator or condenser has a plurality of plates forming a plate stack and defining alternating chambers for a first fluid to be evaporated and a second fluid to be condensed. Each plate has embossed thereon a plurality of parallel spaced beads projecting into the chambers for the first fluid and are oriented parallel to the plate length. Mutually aligned beads of adjoining plates are in contact with one another. Each plate also has, embossed thereon, a plurality of spaced knubs situated between the beads and projecting into the chambers for the second fluid. Mutually aligned knubs of adjoining plates are in contact with one another. The plates further have first and second apertures provided in opposite end zones and extend substantially throughout the plate width. Mutually aligned respective first and second apertures of adjoining plates form first and second flow channels for the first fluid. The first and second flow channels are in communication with the chambers for the first fluid. Each plate has, in the end zones between the first and second apertures, first and second lateral enlargements projecting beyond the rectangular plate outline. Third and fourth apertures are provided, respectively, in the first and second lateral enlargements. Mutually aligned respective third and fourth apertures of adjoining plates form third and fourth flow channels for the second fluid. The third and fourth flow channels are in communication with the chambers for the second fluid.

The measures according to the invention provide that the fluid to be evaporated flows linearly in the respective plate chambers between inlet and outlet without appreciable cross-sectional changes due to the elimination of cross-sectional constrictions in the flow path as well as bends where solid materials contained in the fluid to be evaporated could settle. Further, the plate profiling according to the invention permits an inflow and an outflow of the fluid to be condensed from the side of the plates without thereby adversely affecting the flow characteristics of the fluid to be evaporated or without the need to consider such flow characteristics. This makes possible a higher heat-stressing of the plate and a one-stage construction of the evaporator or the condenser between the fluid to be evaporated and the fluid to be condensed, resulting in a simplification and economy of the apparatus.

According to a further advantageous feature of the invention, the inflow cross section of the fluid to be condensed extends, from the apertures in the space between the plates, in the zone of the work chamber formed by the plates and is oriented transversely to the longitudinal dimension thereof. In this manner, pressure losses are reduced which, according to the invention, may be further diminished by the fact that the distance between the knubs in the transverse and longitudinal directions of the plates is the same so that between the lateral inflow of the fluid to be condensed in the plate space and its subsequent flow perpendicularly thereto, no changes in cross section occur.

According to a further feature of the invention, the plate profile in the zone between the inflow and outflow of the fluid to be evaporated and the inflow and outflow of the fluid to be condensed has a wavy, such as a sinusoidal or trapezoidal configuration extending transversely to the fluid flow. Further, the wavy configuration of adjoining plates is offset by one-half wavelength in such a manner that, related to a plate chamber, the wave crests extending thereinto are, parallel to the medium flow, in mutual contact with one another.

By virtue of the above-outlined construction, the plate chambers in the zones between the inflow and outflow of the fluids participating in the heat exchange are formed practically as tube clusters which, while ensuring a good heat exchange, offer only a low resistance to the fluid flow due to their smooth walls, resulting in the defined, desired, geometric flow characteristics.

As a whole, the features according to the invention provide for an optimal wetting of the plate chambers with the fluid to be evaporated and the fluid to be condensed, whereby a high degree of utilization of the heat exchange surfaces is achieved.

According to a further feature of the invention, the plates, between the enlargements accommodating the apertures for the inflow and outflow of the fluid to be condensed, there is provided a further lateral enlargement accommodating apertures which form an additional channel for admitting the fluid to be condensed. The additional channel, by means of an appropriate design of the circumferential seals, is sealed with respect to the plate chambers and also, in the end plate or head plate there is a bend for directing the fluid to be condensed from the additional channel to the first-described channel.

The above-discussed feature permits that, in case of a particularly large plate stack, the plate chambers for the fluid to be condensed can be charged from both sides of the plate stack whereby the efficiency of the inflow of the fluid to be condensed is augmented without the need of special conduit arrangements situated externally of the plate assembly. Rather, these features provide that a second inlet for the fluid to be condensed is made possible by the particular construction and arrangement of the stamped and embossed plates themselves.

According to the invention, the above-discussed additional channel may have a coupling for the withdrawal of condensate of the fluid to be condensed in the end plate or head plate underneath the joint of the above-discussed bend. This feature provides that in case of a multistage system in which thus a plurality of plate evaporators or plate condensers are connected in series, the condensate of a previous stage is introduced into the additional channel of the successive stage in which, by virtue of such additional channel, an expansion chamber is provided so that from the condensate additional vapor quantities can be extracted which may be added to the fluid to be condensed and which flows in the first channel. In this manner a heat recovery is achieved and the vapor quantity in the first channel is increased without the need of separately provided pumps or heat exchangers. The condensate quantity of the second channel, remaining in this stage, may be withdrawn from the above-noted additional joint and, together with the condensate which is derived from the condensation of the vapor passed through the first channel, may be admitted to a further stage constituted by a plate evaporator or plate condenser.

BRIEF DESCRIPTION OF THE DRAWING

FIG. 5 is a fragmentary sectional view of a plate stack taken along line V—V of FIG. 3.

FIG. 6 is a fragmentary sectional view of a plate stack taken along line VI—VI of FIG. 3.

FIG. 7 is an exploded schematic perspective view of a plate evaporator comprising face-to-face arranged plates structured according to FIGS. 3 and 4.

DESCRIPTION OF THE PRIOR ART STRUCTURE

Figure 1:
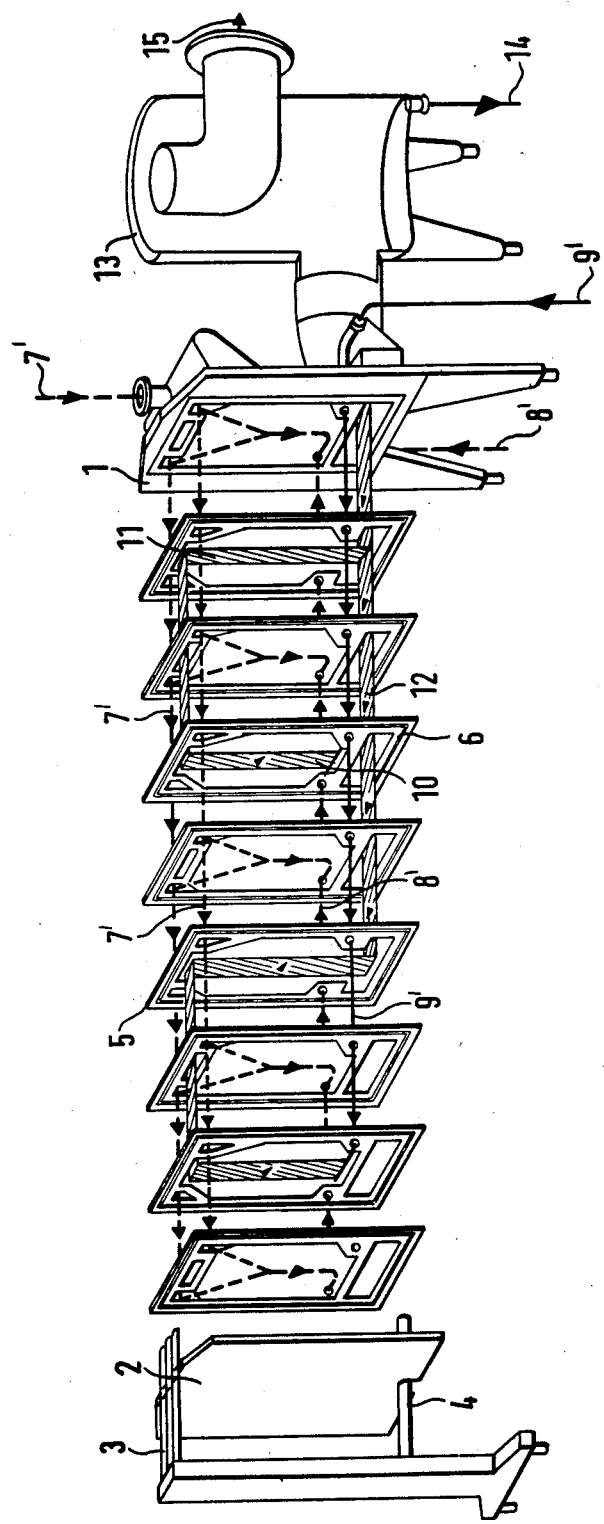
FIG. 1 is an exploded schematic perspective view of a plate evaporator structured according to the prior art.

Turning to FIG. 1, there is illustrated, in an exploded view, a two-stage plate evaporator of known construction. It comprises a frame including an end plate 1 affixed thereto and a horizontally displaceable head plate 2 as well as horizontal, longitudinally extending upper and lower guide bars 3 and 4 which support a plurality of face-to-face arranged evaporator plates 5. The latter can be pressed to one another in a known manner (not illustrated) to form a stack. The plate stack has plate chambers which are defined by circumferential seals 6 and adjoining plates and which are, in an alternating sequence, associated with the fluid to be evaporated and the fluid to be condensed, respectively.

In the corner zones the plates 5 are provided with apertures which, in cooperation with appropriately designed circumferential seals 6, form two inflow channels 7' for the vapor, that is, for the fluid to be condensed and an outflow channel 8' for its condensate as well as an inflow channel 9' for the fluid to be evaporated whose concentrate and vapor components leave through a channel 12' formed by the plates 5, subsequent to evaporation in two stages 10 and 11. The channel 12' opens into a device 13 in which the concentrate 14 is separated from the vapor 15.

Figure 2:
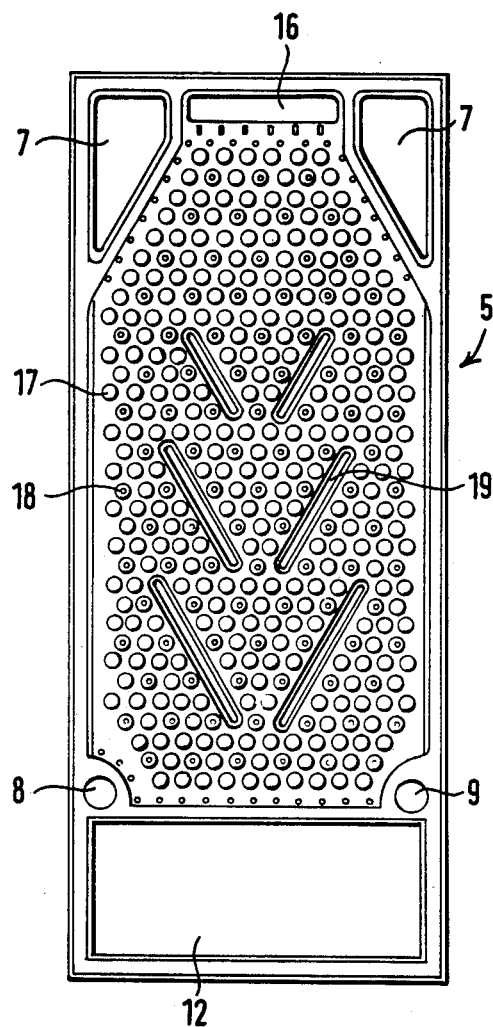
FIG. 2 is a front elevational view of a plate of the evaporator according to FIG. 1.

Turning now to FIG. 2, there is illustrated a single plate of the plate stack forming part of the FIG. 1 construction. The plate has apertures 7 for the heating vapor at the top of the plate, an inflow opening 9 for the fluid to be evaporated and leading to the first evaporating stage 10, a product crossover opening 16 leading to the second evaporator stage 11 as well as a product outlet aperture 12 leading from the second evaporator stage 11. There is further visible an outflow opening 8 for the vapor condensate of the fluid to be condensed.

The plates 5 have generally hemispherical protuberances (embossments) 17 and 18 on both sides, by means of which adjoining and face-to-face arranged plates are in contacting support with one another, in addition to the engagement between the circumferential seals which are not shown in detail. Further, the plates 5 have elongated embossments (welts) 19 which serve for guiding the fluid.

In the known plate construction, the fluid first has to spread over the plate width from the cross-sectional zone determined by the opening 9 and then, after the first evaporator stage 10, it has to spread again over the entire plate width in the second evaporator stage 11 as it passes through the opening 16 until withdrawal can be effected through the channel 12'. These varying cross-sectional enlargements and constrictions lead in the known plate construction to non-uniform stresses of the plate surface and thus to an evaporating process which is not uniform over the plate surface. In addition, the product flow is interrupted and interfered with by the hemispherical protuberances 17 and 18 which leads to vortices and thus to interferences with the evaporating process, including overheating and baking of the more solid particles to the plates on the side of the fluid to be evaporated.

As concerns the vapor side, that is, that side of the plates which is used for the fluid to be condensed, the inlet apertures 7 on both sides provide, to be sure, a relatively uniform distribution of the vapor over the plate cross section, the vapor condensate, however, has to be withdrawn eventually through the outlet opening 8 which means—from the point of view of flow dynamics—that on the vapor side the fluid passing through the opening 9 is not served efficiently. This too, results in unsatisfactory heat exchange conditions in the zone of the fluid inlet channel 9'.

DESCRIPTION OF THE PREFERRED EMBODIMENTS

Figure 3:
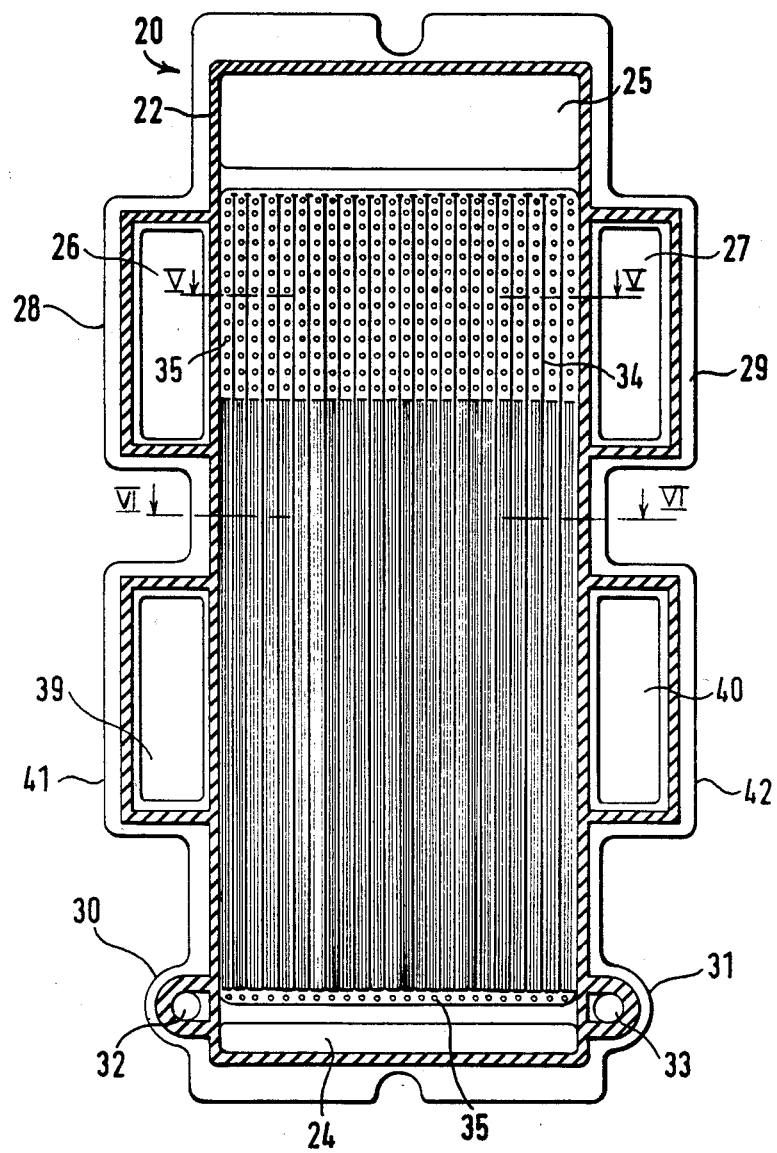
FIG. 3 is a front elevational view of a plate (associated with the fluid to be evaporated) according to a preferred embodiment of the invention.
Figure 4:
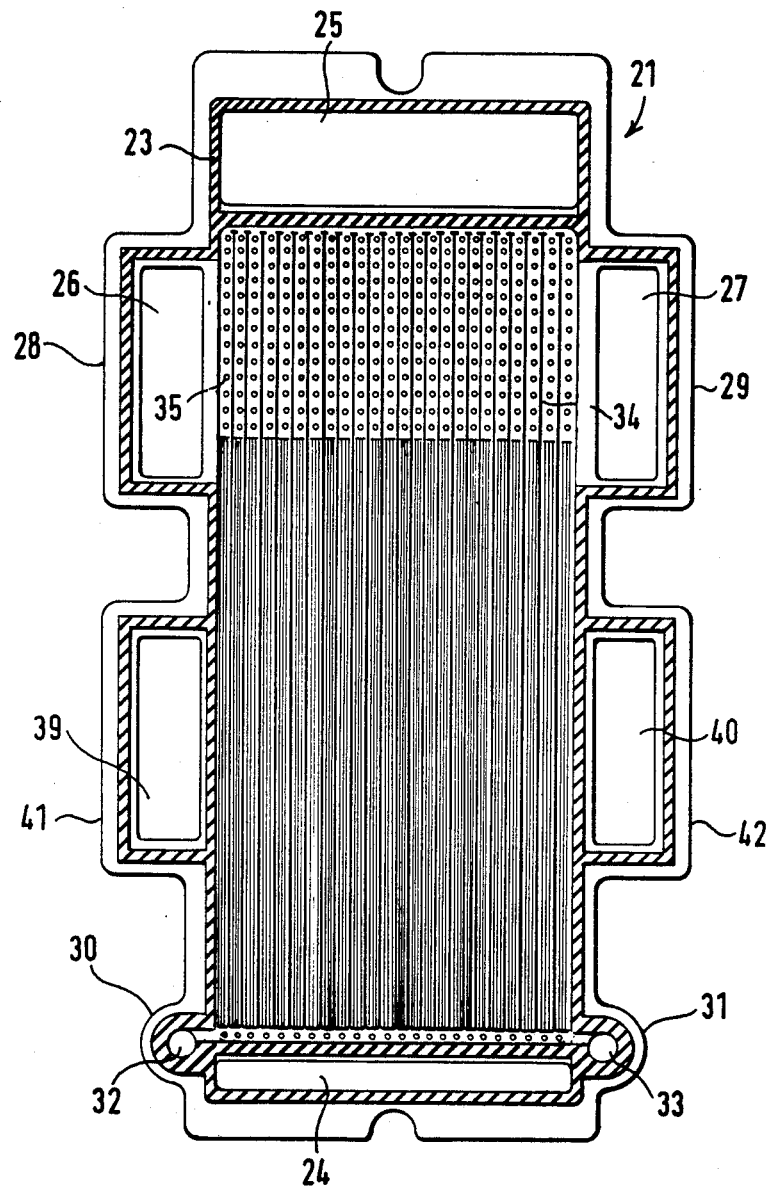
FIG. 4 is a front elevational view of a plate (associated with the fluid to be condensed) according to a preferred embodiment of the invention.

Turning now to FIGS. 3 and 4, there are illustrated preferred embodiments of an evaporator plate and a condenser plate, respectively, according to the invention. FIG. 3 illustrates a plate generally designated at 20 for the fluid to be evaporated while FIG. 4 shows a plate generally designated at 21 for the fluid to be condensed.

The plates 20 and 21 both have, in their lower region, over the entire width between the circumferential seal 22 (plate 20) or 23 (plate 21) a rectangular fluid inlet opening 24 which is accordingly open over the entire plate width towards the plate side associated with the fluid to be evaporated (FIG. 3). The side of the plates associated with the fluid to be evaporated terminates with an opening 25 for the outflow of the evaporated product formed by vapor and concentrate. The opening 25 too, extends over the entire plate width within the circumferential seal 22 (FIG. 3) or 23 (FIG. 4).

In the upper part of the plates, underneath the outflow opening 25, there are provided enlargements 28 and 29 which project laterally from the rectangular plates and in which there are formed respective openings 26 and 27, constituting channels for the inflow of heating fluid or vapor. Further, at the foot portion of the plates enlargements 30 and 31 are provided in which respective openings 32 and 33 are formed for constituting channels for the outflow of the condensate of the heating fluid.

The embossed configuration of the plates shown in FIGS. 3 and 4 differs in that in the zone of the openings 26, 27 the plates are supported on one another on the product side by vertically extending embossed beads 34. The mutual support of the plates in the direction of the vapor chambers is effected by means of knubs 35 (dot-like projections) which are situated between adjoining beads 34 as well as in the zone between openings 32, 33 and which project into the vapor chambers. The resulting alternating cross-sectional profile between the product plates 20 and the vapor plates 21 at the height of the openings 26 and 27 is illustrated in the sectional FIG. 5. Thus, as illustrated in FIG. 5, adjoining plates 20, 21 define a first fluid chamber constituted of a plurality of parallel, unobstructed channels 34a extending in the length dimension of the plates 20, 21 (that is, perpendicularly to the plane of FIG. 5) and separated from one another by face-to-face contacting pairs of the continuous beads 34 oriented in the length dimension of the plates 20, 21. The channels 34a guide the product (that is, a liquid to be vaporized) and are, for this purpose, in communication with the fluid inlet 24 and the fluid outlet opening 25. Adjoining plates 20, 21 further define a second fluid chamber into which extend, from both plates 20, 21, the pairwise contacting dot-like knubs 35. The pairs of knubs 35 are arranged in parallel columns oriented in the length dimension of the plates 20, 21 (FIGS. 3 and 4). Adjoining knub columns define laterally communicating unobstructed channels 35a. The channels 35a guide the heating medium (vapor) towards outlet openings 32, 33 parallel to the product flowing in channels 34a after the vapor has entered laterally into the channels 35a through the knub columns from the vapor inlet openings 26, 27.

Thus, by virtue of the above-discussed profiling of the plates 20 and 21, as it may be observed particularly in FIG. 5, the product flowing through the inlet opening 24 arrives immediately over the entire plate width into channels 34a which extend parallel to the direction of flow and along which the product may reach the outflow opening 25 without deflection and cross-sectional restriction in case of a one-stage structure of the plate evaporator. Further, the heating fluid, that is, the fluid to be condensed may, as heating vapor, stream into the upper zone of the associated plate chambers laterally through the openings 26 and 27 as shown in FIG. 4 by virtue of the mutual support by the knubs 35 and can move, after spreading over the entire plate width, downwardly to the outflow openings 32 and 33.

It is of importance in this connection that the inflow cross section extending from the openings 26, 27 corresponds to the cross section available for the fluid to be condensed, between the plates in the subsequent zones of propagation. This is ensured by providing, in particular, in that the distance between the knubs 35 both in the transversal direction of the plates as well as in the vertical direction is approximately the same so that the knub arrangement does not cause a change in the cross section.

The particular profiled structure of the plates shown for the upper and lower zones of the plates may be present along the entire plate height. As illustrated in FIGS. 3, 4 and 6, it is feasible, however, to provide in the zone between the openings 25, 26 and 27 on the one hand and openings 24, 32 and 33 on the other hand, a wavy (trapezoidal wave) plate profile wherein the wavy configuration of adjoining plates is arranged with a shift of one-half wavelength such that, related to one plate chamber, the wave crests 37 and 38 (shown in the cross-sectional FIG. 6) which project into the plate chamber, are in supporting engagement with one another in a direction parallel to the flow of the fluid. By virtue of such a construction, the flow chambers for the product, that is, for the fluid to be evaporated, on the one hand, and the heating fluid, that is, the fluid to be condensed, on the other hand, are formed practically as smooth tube clusters and therefore define flow and heat exchange surfaces based on the geometric conditions.

As seen in FIGS. 3 and 4, and also referring to FIG. 7, the plates 20 and 21 have not only inflow openings 26 and 27 for the heating medium symmetrically to the vertical central line of the plates, but also have inflow channels 39', 40' (formed by respective aligned openings 39, 40 of consecutive plates) which are provided between the inflow channels 26, 27 and the return flow channels 32' and 33'. The openings 39, 40 are formed in additional lateral enlargements 41 and 42. The heating medium, related to its admission either from the end plate or from the head plate, may be directed through the inflow channels 39', 40' to the inflow channels 26' and 27' additionally by means of flow deflection. In this manner, there is assured a better heating medium supply in plate evaporators of substantial length.

The additional channels (inflow paths) 39' and 40' further provide for the possibility that, in a multistage evaporator or condenser formed of a plurality of serially arranged plate assemblies, the condensate obtained from the preceding or first stage may be supplied to the next or second stage through their channels 39' and 40' where the condensate encounters an expansion chamber in which it may generate additional vapor quantities which may be directed into the channels 26' and 27'. Thus, the heat quantity contained in the condensate taken from the previous stage may be further utilized without the need of additional structural measures. Such a possibility was non-existent in plate evaporators or condensers known heretofore. The condensate associated with or remaining in the channels 39' and 40' in the above-noted second stage may be withdrawn through an additional outflow conduit and may be admitted to a further stage in a corresponding manner.

Referring particularly to FIG. 7, there are shown schematically the flow conditions which correspond to the illustration of FIG. 1 without, however, showing the apparatus frame.

According to FIG. 7, in a plate stack 43 the heating fluid admission, that is, the admission of the fluid to be condensed, is effected through channels 26' and 27' along parallel arrows 44 while the admission of further heating fluid is effected through the channels 39' and 40' along the parallel arrows 45. On the side opposite the fluid supply, between the lower and the upper channels, there is provided a deflection path (bend) 46 from where the heating fluid or vapor advances in the channels 26' and 27' in a counterflow along the parallel arrows 47. Expediently, between the two inflow directions 44 and 47 a separator 48 may be provided which may be realized in a simple manner by providing that in the mid-zone of the plate stack 43 one of the plates has blocked (unstamped) openings 26 and 27.

The example shown in FIG. 7 relates to a one-stage plate evaporator wherein the fluid 50 to be condensed is admitted through channels 26' and 27' on the one hand and through channels 39' and 40' on the other hand with the aid of the bend 46 and the separator 48. As explained earlier, there is, however, provided the possibility to admit the fluid 50 to be condensed only through the channels 26' and 27' and to charge the channels 39' and 40' in a multi-stage apparatus with the condensate obtained from a preceding stage, whereby this condensate then encounters an expansion chamber in the channels 39' and 40' whereupon from such condensate further vapor may be generated which is admitted to the channels 26' and 27' through the bend 46. In such a case the separator 48 is, as a rule, not needed. The condensate remaining in the channels 39' and 40' upon expansion may be admitted to the condensate outlet flow 53 through the joints 51 and 52 and may be utilized in a successive evaporation stage in a manner as described earlier in connection with the channels 39' and 40'.

It is in general noted that the bend 46 may also be provided at the right-hand side front plate which terminates the plate stack, while omitting the separator 48, so that the terminal plate on the left-hand side may be without joints or openings. The particular design is determined by the particular requirements in individual cases.

It will be further understood that, as known, in a plate evaporator or plate condenser the area of the heating fluid inflow openings 26 and 27 is greater than the area of the condensate outflow opening 32, 33 while, in contradistinction, on the product side, that is, on the side of the fluid to be evaporated, the area of the inflow opening 24 is smaller than the area of the outflow opening 25. As seen in FIGS. 3 through 6, because of the differently structured profiling of the plates serving for the evaporation of the one fluid on the one hand and of the plates serving for the condensation of the other fluid, on the other hand, different plate types are required.

It will be understood that the above description of the present invention is susceptible to various modifications, changes and adaptations, and the same are intended to be comprehended within the meaning and range of equivalents of the appended claims.

What is claimed is:

1. In a plate evaporator or condenser having a plurality of generally rectangular plates each having a length dimension and a width dimension, said plates being arranged in a face-to-face oriented plate series to form a plate stack, adjoining plates being in sealing engagement with one another and defining, together with circumferential seals, alternating chambers for a first fluid to be evaporated and a second fluid to be condensed; the improvement comprising:

(a) more than two parallel spaced beads forming embossed portions of each said plate; said beads projecting solely into each chamber for said first fluid and being oriented parallel to said length dimension; mutually aligned beads of adjoining plates being in contact with one another and dividing each chamber for said first fluid into a plurality of unobstructed channels extending parallel to said length dimension and arranged side by side in a series along and substantially throughout said width dimension; each said channel having a first end and a second end opposite said first end and spaced from said first end in a direction parallel to said length dimension; said first ends being situated along and substantially throughout said width dimension; said second ends being situated along and substantially throughout said width dimension;

(b) a plurality of spaced knubs forming embossed portions of each said plate; said knubs being essentially dot-like protuberances situated between said beads and projecting solely into each chamber for said second fluid; mutually aligned knubs of adjoining plates being in contact with one another; said knubs dividing each chamber for said second fluid into a plurality of unobstructed channels extending parallel to said length dimension and being in communication with one another in a direction parallel to said width dimension;

(c) first and second apertures provided in opposite end zones of said plates; said first and second apertures being spaced from one another in a direction parallel to said length dimension; said first and second apertures each extending substantially throughout said width dimension; said first and second apertures of adjoining plates being mutually aligned so as to form first and second flow channels for said first fluid through said plate stack; said first aperture constituting an inlet for said first fluid into said channels for said first fluid and said second aperture constituting an outlet for said first fluid from said channels for said first fluid; said first aperture being in communication with said first end of each channel for said first fluid, and said second aperture being in communication with said second end of each channel for said first fluid for guiding the first fluid in each channel for said first fluid parallel to said length dimension from the first end of each channel for said first fluid to the second end thereof for effecting a unidirectional flow of the first fluid from said first aperture into said second aperture through said channels for said first fluid substantially throughout said width dimension of each said plate;

(d) first and second lateral enlargements projecting beyond a rectangular outline of each said plate in said end zones between said first and second apertures; and (e) third and fourth apertures provided in each said first and second lateral enlargement; said third and fourth apertures of adjoining plates being mutually aligned so as to form third and fourth flow channels for said second fluid through said plate stack; said third and fourth flow channels being in communication with said channels of each chamber for said second fluid, said third apertures being arranged for introducing the second fluid into said channels of each chamber for the second fluid in a direction parallel to said width dimension from an edge portion of said plates.

2. A plate evaporator or condenser as defined in claim 1, wherein the distance between said knubs is approximately the same in the direction of said length dimension and in the direction of said width dimension.

3. A plate evaporator or condenser as defined in claim 1, wherein each said plate has a length portion extending between said first and second apertures; said length portion being divided into a first length part and a second length part; said beads and knubs extending in said first length part substantially throughout said width dimension; in said second length part each said plate has the shape of a wave having parallel-extending crests and valleys oriented in the direction of said length dimension and occupying said second length part substantially throughout said width dimension; the waves of adjoining plates being shifted by one half wavelength, whereby waves belonging to adjoining plates are in contact with one another along said crests.

4. A plate evaporator or condenser as defined in claim 1, further comprising a third lateral enlargement projecting beyond the rectangular outline of each said plate between said first and second lateral enlargements, a fifth aperture provided in each said third lateral enlargement; said fifth apertures of adjoining plates being mutually aligned so as to form a fifth flow channel for said second fluid; said fifth flow channel being sealed from said chambers; and first and second terminal plates adjoining said plate stack at opposite ends thereof; said fifth flow channel communicating with said first flow channel with the intermediary of a bent flow channel portion situated in said first terminal plate.

5. A plate evaporator or condenser as defined in claim 4, further comprising an outlet nipple situated in said second terminal plate at a height level below said bent flow channel portion; said outlet nipple communicating with said fifth flow channel for removing condensate from said second fluid.

6. A plate evaporator or condenser as defined in claim 4, wherein said first flow channel is obturated approximately at mid-length of said plate stack.

7. A plate evaporator or condenser as defined in claim 6, wherein one of the plates situated approximately at mid-length of said plate stack is void of said first aperture so as to provide said obturated first flow channel.

8. A plate evaporator or condenser as defined in claim 4, wherein the lateral enlargements, the apertures provided therein and said third, fourth and fifth flow channels are arranged in pairs in a mirror image with respect to longitudinal center lines of said plates.

9. A plate evaporator or condenser as defined in claim 1, wherein adjoining plates define, in said chambers for said second fluid, a flow passage cross section for said second fluid; said flow passage cross section extending parallel to said width dimension from said third and fourth apertures.

10. A plate evaporator as defined in claim 1, wherein said third apertures are arranged for introducing the second fluid into said channels of each chamber for the second fluid parallel to said width dimension from opposite edge portions of said plates.

* * * * *